DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916. O.G. 1213

T916,008

METHOD FOR PREPARING FIRE-RETARDANT POLYESTER FIBERS

Allan R. Rothwell, Rte. 8, Lonesome Pine Road, and Gary L. Bond, Rte. 10, Country Joy Apartments, Apt. 5, both of Kingsport, Tenn. 37664

Filed Apr. 6, 1973, Ser. No. 348,547

Int. Cl. D06p *5/00;* C09k *3/28*

U.S. Cl. 8—17

No Drawing. 8 Pages Specification

Disclosed is a process for preparing fire-retardant polyester fibers comprising contacting, at a temperature in the range of 350° to 410° F., for a period of time in the range of 15 to 90 seconds a polyester fiber, a disperse dye, and an organic bromine compound of at least 6 carbon atoms that does not chemically react with the polyester, the organic bromine compound containing, based on the weight of the organic bromine compound, from about 40 to about 85 weight percent bromine. Poly(ethylene terephthalate) and poly(1,4-cyclohexylenedimethylene terephthalate) fibers are particularly desirable polyester fibers. Tris(2,3-dibromopropyl) phosphate is a particularly desirable organic bromine compound.